Aug. 30, 1927.  1,640,432
H. E. WARREN
METHOD AND MEANS FOR MANUFACTURING GEAR WHEELS
Filed April 27, 1925    2 Sheets-Sheet 2

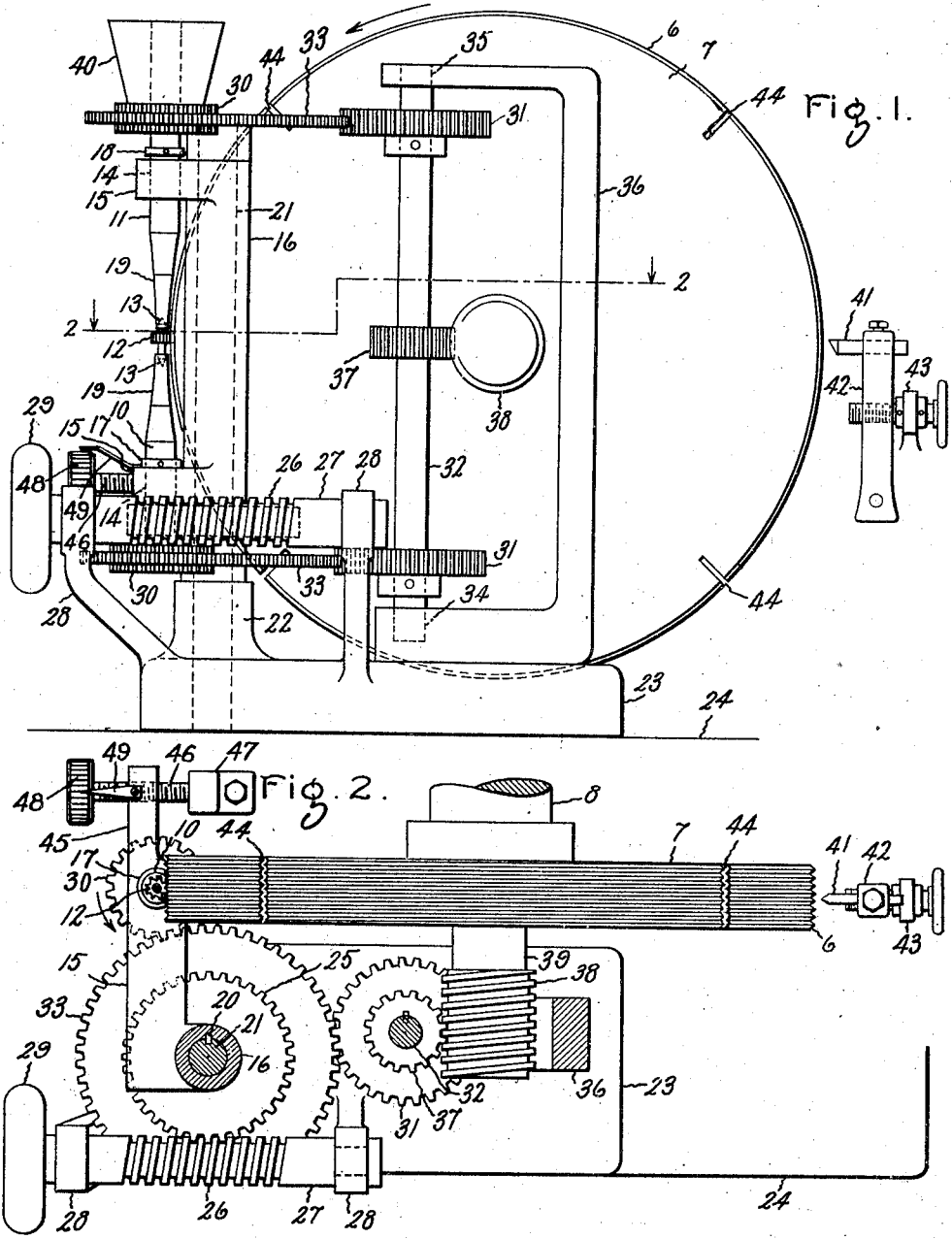

Inventor:
Henry E. Warren,
by
His Attorney.

Patented Aug. 30, 1927.

1,640,432

UNITED STATES PATENT OFFICE.

HENRY E. WARREN, OF ASHLAND, MASSACHUSETTS, ASSIGNOR TO GENERAL ELECTRIC COMPANY, A CORPORATION OF NEW YORK.

METHOD AND MEANS FOR MANUFACTURING GEAR WHEELS.

Application filed April 27, 1925. Serial No. 25,991.

The present invention relates to a method and means for manufacturing gear wheels. More particularly the invention relates to a method and means for manufacturing small gear wheels or pinions and has for its object the provision of an improved method, and means for carrying out said method, which is not subject to the difficulties and disadvantages attending the manufacture of pinions and similar gear wheels by previous methods, and which permits a higher production rate and greater accuracy in the formation and finish of the pinion or gear wheel teeth than has hitherto been possible.

Although the invention broadly applies to the production of pinions and other gear wheels of any size, it is especially well adapted to the production of relatively small pinions such as are used in precision instruments, watches, clocks and the like, and which usually comprise a blank or body integral with a shaft protruding from one or both of its ends.

The difficulty with holding small gear wheels, such as watch and clock pinions, for example, for the purpose of forming and finishing the teeth thereon, and the fact that methods involving separate cutting, finishing and hardening operations to form the teeth have been used heretofore, has rendered their production comparatively slow and costly. Aside from imperfections in tooth form and finish resulting from the usual cutting operation, considerable time is consumed in setting up the pinion blank for the finishing operation in a separate finishing machine, and the subsequent hardening operation if used, often results in warping of the finished teeth, which further involves costly rejections.

As stated hereinbefore, the method and means of the present invention is particularly well adapted to the rapid production of accurately formed and finished gear wheels of very small size, which presents certain difficulties not found in the production of the larger gear wheels. For this reason, a means for carrying out the method of the invention in connection with such pinions is illustrated in the accompanying drawings, and for a consideration of what is believed to be novel and the invention, attention is now directed to said drawings, the description in connection therewith and the appended claims.

Figure 3:
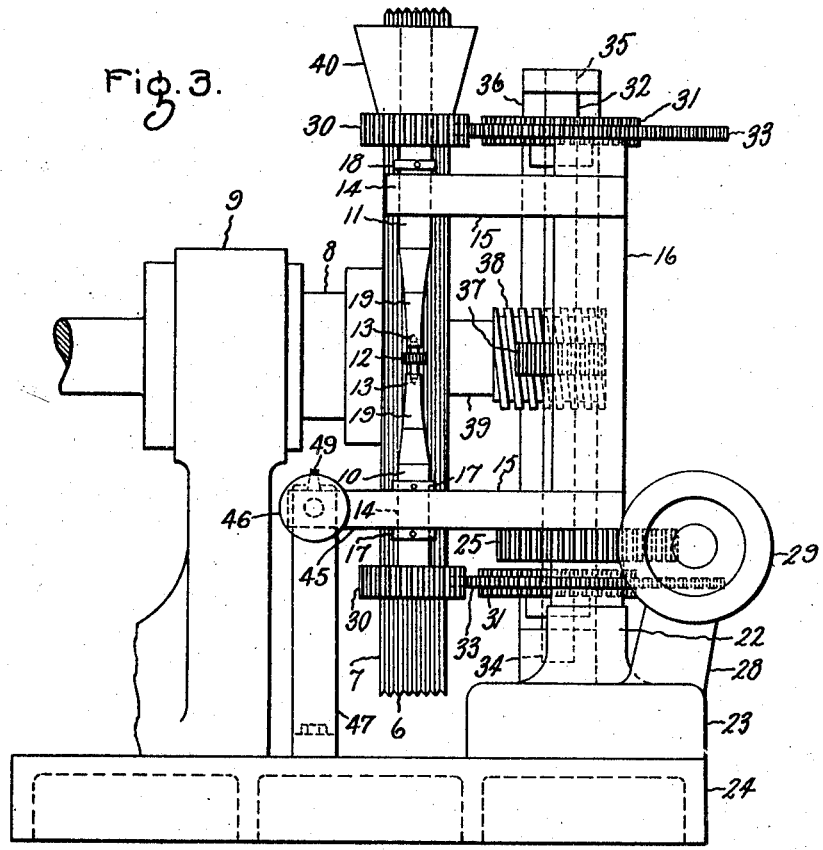
Figure 4:
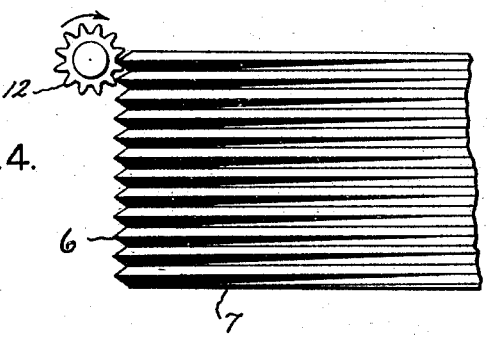

In the drawings, Fig. 1 is an end view on an enlarged scale of a pinion generating machine for carrying out the method of the invention in the manufacture of small pinions; Fig. 2 is a top view of the same, partly in section, taken along the line 2—2 of Fig. 1; Fig. 3 is a side view of the machine shown in Fig. 1, and Fig. 4 is a detail view, on a greatly enlarged scale, showing the operation relation between a pinion and the means by which the teeth thereon are formed.

Referring to the drawings, 6 is a screwthread or gear-tooth generating worm, the threads of which correspond in shape and pitch with the shape and circular pitch of the pinion teeth which are to be produced. The worm is accurately formed on the periphery of a disk 7 which is of relatively soft metal, preferably cast iron or soft steel, although other suitable metals may of course be used to meet certain conditions. The disk is of such thickness that it provides a rigid, non-flexible carrying means for the generating worm and is mounted to rotate in a vertical plane on a horizontal shaft 8. In order to give the disk a high peripheral speed, it is of comparatively large diameter.

The shaft 8 is accurately journaled in a rigid supporting bearing-pedestal 9 which, together with the shaft, is of liberal dimensions to provide a rigid, non-flexible carrying means for the disk, whereby the disk is caused to rotate about a fixed axis and in a fixed plane of rotation. The shaft and disk may be driven by any suitable means (not shown).

Adjacent the periphery of the disk, at what may be considered to be the front of the machine, are two opposed, pinion-holding spindles 10 and 11. The spindles are accurately aligned with each other to rotate about a common vertical axis and are adapted at their adjacent ends to grip the shaft ends of a pinion blank 12, being provided for this purpose with centering sockets 13 in which the pinion-blank shaft ends are seated and accurately centered. The pinion-holding spindles are rotated by suitable means, hereinafter described, to rotate the pinion blank accurately about its axis of rotation.

The pinion-holding spindles are held to rotate in tangential relation to the periphery of the disk, and the generating worm thereon, in bearings 14 in the ends of a pair of spaced parallel arms 15 which are integral with and joined by a cylindrical hub 16. The arms and hub form a swinging bracket on which the pinion holding spindles may be moved to carry the pinion blank into and out of tangential frictional engagement with the generating worm.

In order that the pinion blank may meet the generating worm at the point of tangency, the spindles are adjustable axially in their respective bearings 14, spindle 10 being fixed after adjustment by suitably set-screwed collars 17 and spindle 11 being located by a similar collar 18 above the upper arm.

It will be noted that this last-named collar does not seat on the upper arm when a pinion blank is in place. This permits the weight of the spindle to aid in gripping the pinion blank. A second collar below the upper arm is not provided in connection with spindle 11 so that said spindle may be raised axially away from the other to permit the easy and rapid removal or insertion of a pinion blank between them.

The spindles thus form automatic centering and gripping means for rotating a pinion blank in tangent relation to the periphery of the disk and generating worm. In order that the spindles may not come into contact with the generating worm when used with very small pinions, such as that shown, the ends of the spindles are suitably tapered as indicated at 19.

The hub 16 of the swinging bracket arrangement is keyed as indicated at 20 (Fig. 2) to a vertical pivot shaft 21 which is axially parallel with the spindles 10 and 11 and which swings in a socket bearing 22 provided for its lower end on a base 23. The base 23 and the bearing-pedestal 9 are secured to a suitable sub-base 24 which provides a rigid support for them.

The swinging movement of the pinion-holding spindles with the pivot shaft 21 is controlled by a worm gear 25 keyed to the pivot shaft and a worm 26 meshing therewith. The worm is carried by a shaft 27 which is suitably journaled in a pair of fixed brackets 28 integral with the base 23. The shaft 27 extends in a front-to-rear direction and is provided at its front end with a hand wheel 29 by which it is rotated. This arrangement permits an operator to move the pinion blank into and out of engagement with the generating worm by turning the hand wheel which is thus located in a convenient operating position at the front of the machine.

The pinion-holding spindles 10 and 11 are arranged to be rotated together as one spindle and in a certain fixed relation to the rotation of the disk 7 and generating worm 6 by duplicate gear trains driven from shaft 8.

The duplicate gear trains comprise gears 30 carried by and secured to the outer ends of the spindles, a pair of drive gears 31 carried by and secured in spaced relation to each other on a drive shaft 32 and idler gears 33 which mesh with gears 31 and 30 and transmit driving motion from the former to the latter. The idler gears are carried by the pivot shaft 21 and are freely rotatable thereon. With this arrangement the operation of the gear trains is not affected by the movement of the swinging arms 15 when the pinion blank is moved with respect to the generating worm, as the idler gears rotate about the pivot axis of the arms.

The drive shaft 32, on which the drive gears 31 for the gear trains are secured, is journaled at its ends in suitable bearings, indicated at 34 and 35, which are provided in the arms of a U-shaped bracket 36 mounted on the base 23. A worm gear 37 keyed to the drive shaft 32 and a worm 38 provided on an extended end 39 of the shaft 8, which worm meshes with the worm gear, completes the driving connection between the shaft 8 and the pinion-holding spindles 10 and 11. The relative directions of rotation of the disk and pinion blank are indicated by suitably located arrows in Figs. 1 and 2.

A positive driving relation between shaft 8 and the pinion-holding spindles is thus set up by the gear train connection between them, which is, in effect, a reduction gearing having a reduction ratio of N to 1 in which N is the number of revolutions of the disk for one revolution of the spindles.

In the present example, with a single helical thread on the generating worm, N also corresponds to the number of teeth to be generated on the pinion blank. With this arrangement, the pinion blank will revolve through an angle equal to one tooth of the pinion to be generated for each revolution of the generating worm, that is, if the pinion is to have twelve teeth, the generating worm will revolve twelve times for each revolution of the pinion blank.

It should be understood that the generating worm may have a multiple thread for use in generating certain pinions, in which case the gear train connection will be arranged to provide a reduction ratio of $\frac{N}{T}$ to 1 in which T is the number of separate threads on the generating worm. This would merely provide that the pinion would advance more than one tooth for each revolution of the generating worm and in no way changes the method or operation of the machine.

To prevent slipping of the pinion blank and to insure the correct rotational relation between the pinion blank and the generating worm as hereinbefore described, the weight of the upper spindle, as a clamping means, may be supplemented by an additional force set up by any suitable means such as a comparatively heavy weight, indicated at 40, which seats against the gear 30 on the upper end of spindle 11. After the teeth are partly formed the generating worm tends to keep the pinion in rotation so that very little extra force is required to turn the pinion. The holding means for the pinion, as shown, has proved to be reliable and satisfactory in operation and permits the pinions to be quickly removed or inserted.

With the generating worm revolving at a high speed and with the pinion blank in place between the spindles 10 and 11 and being driven thereby from shaft 8, the pinion blank is gradually moved into frictional engagement with the generating worm by rotating the hand wheel 29 in the proper direction. The heat generated by the rubbing contact set up between the pinion blank and generating worm very rapidly raises the temperature of the blank to such a high degree that the metal of which it is made becomes soft at the point of contact and is brushed away by the threads of the generating worm without injuring the latter and without raising the temperature of the disk perceptibly.

The rubbing contact between the blank and generating worm is maintained, as the surplus material is removed from the blank, by rotating the hand wheel 29 to carry the blank gradually in the direction of the generating worm until the desired tooth depth is obtained. In this manner the teeth on the pinion blank are very quickly and very perfectly formed, the result being superior as regards smoothness and correct outline to that which is obtained by the usual processes in which the metal is actually cut away.

It will be seen that, as the pinion blank is slowly fed radially toward the generating worm, the latter gives increasing depth and form to the teeth until the desired depth is reached. Thus all of the teeth are formed substantially simultaneously. This results in the more uniform heating of the pinion blank and materially aids in the production of perfect pinions, since there is no local heating and resulting distortion of the blank.

After the pinion is generated and the teeth are formed to the desired depth, the surfaces of the teeth are finished or polished to glass-like smoothness by permitting the pinion and generating worm to revolve together slightly in contact until the finished pinion is comparatively cool. This occupies but a brief interval after the teeth are formed and results in a completely finished pinion in one operation.

With blanks of high carbon steel, the comparatively sudden cooling, during the interval when the finished pinion and generating worm are revolving together, leaves the surfaces of the teeth tempered hard without danger of warping or further oxidizing, which characterizes the usual method whereby the gear teeth are cut in one operation and afterwards hardened, with a separate polishing operation following the hardening operation if used.

Thus the method of the present invention provides at one set-up and in one short operation, not only for accurately forming and completely finishing a pinion from the blank, but also, when the pinion blank is of the proper material, for case hardening the finished pinion. Thus, in accordance with the invention, the pinion, when removed from the machine, is perfectly formed, finished and ready for use without subsequent operations. With low carbon steel there is, of course, no hardening.

A desirable feature of the present embodiment of the invention is the means provided for maintaining the generating worm smooth and of the correct thread shape. This is shown in Figs. 1 and 2. Referring particularly to Figs. 1 and 2, 41 is a cutting tool of the well known circular forming type which can be ground indefinitely without changing its shape. The cutting tool is mounted in a suitable holder 42 at the back of the machine and is movable into engagement with the generating worm by a hand wheel and screw arrangement 43.

While the disk 7 is being slowly rotated in a backward direction, the tool is made to traverse the face of the disk in contact with the screw thread or generating worm thereon. This arrangement permits the thread of the generating worm, when worn or roughened, to be smoothed, trued and put back into operation with a minimum loss of operating time. It will be seen that with a smoothing and truing device of this nature available for immediate use, not only is the operation of the machine made easier but also both the quality and quantity of production are maintained at a higher value than would be possible without it.

As the means for permitting the traverse of the tool across the face of the disk and the means on which the tool is mounted may be provided in numerous ways and are old and well known in connection with lathes and similar machine tools, the same have been omitted in the drawings for the purpose of simplifying the latter.

In the production of pinions of different materials, it has been found desirable to provide a few radial clearance notches, indicated at 44, at intervals about the periphery of the disk 7, into which the surplus material removed from the pinion by the generating worm, may fall and clear to each side of the disk. These notches seem to be of greatest assistance in permitting the removal of surplus material when the pinion being generated is very hot.

In connection with the swinging bracket for the pinion holding spindles, an adjustable stop means of any suitable construction may be provided to limit the swinging movement of the spindles and pinion blank in the direction of the generating worm 6 and disk 7 whereby the depth of the generated teeth on the blank may be set to the correct value.

In the present example a stop means of this nature is provided in connection with the lower arm 15 and comprises an extension member 45, integral with the arm, through the outer end of which is threaded a thumb screw 46. The thumb screw is adjusted to engage at its end with a vertical post 47 when the pinion blank 12 is moved fully into engagement with the generating worm and the desired tooth depth is reached. The post is secured to the sub-base 24 and forms a rigid stop for the thumb screw. The adjustment of the thumb screw is facilitated by suitable graduations 48 on the head of the screw and a fixed index 49 lying over the graduations.

While the invention has been herein described and illustrated in connection with a pinion generating machine for very small pinions, for reasons hereinbefore stated, it should be understood that it is not limited to the production of small pinions. By providing the proper speed and proportionate parts, larger pinions and gears may be formed and finished according to the method of the invention.

In the production of gears and pinions in the larger sizes, it is desirable to preheat the blank so that it will be hot when pressed against the generating worm and in such gears and pinions, particularly those having relatively wide faces, it may be desirable to provide for axial movement of the blank when forming the teeth, to obviate the slight curvature which results in the fixed arrangement shown in the present example. The means for permitting the desired axial movement of the blank is easily provided for and will be obvious to those skilled in the art. For the smaller pinions, such as clock pinions and the like, the slight curvature is hardly perceptible and is of no importance. Hence in the machine of the present example, means for moving the blank axially during the forming operation, to remove such curvature, has not been provided.

What I claim as new and desire to secure by Letters Patent of the United States, is:

1. The method of producing finished gear teeth on a gear wheel blank in one operation, which comprises removing surplus material from the blank to form gear teeth thereon by rotating the blank about its axis of rotation in frictional contact with a smooth rapidly moving gear tooth generating thread which corresponds in shape and in pitch with the shape and circular pitch of the desired gear teeth, the blank being gradually moved toward the generating thread until the desired tooth depth is obtained, the removal of material being thereby effected by friction assisted by the heat developed thereby and all of the gear teeth being formed substantially simultaneously, and then permitting the formed gear wheel to continue to revolve in slight contact with the generating thread to finish and polish the teeth while said gear wheel is cooling.

2. The method of manufacturing pinions and the like, which comprises revolving a pinion blank about its axis, moving said blank radially into frictional contact with a revolving disk of relatively large diameter on the periphery of which is a gear-tooth forming thread, the disk making as many revolutions as there are teeth to be formed on the blank for each revolution of the blank, maintaining the blank in frictional contact with the disk by slow radial movement of the blank while being rotated until the gear teeth are completely formed thereon, all of said teeth being formed thereby substantially simultaneously, the removal of material from the blank between the teeth being effected by the frictional contact with the tooth forming thread and through the assistance of the heat generated thereby, and then permiting the formed pinion to revolve in slight contact with the disk until comparatively cool to finish and polish the teeth thereon, whereby in one continuous operation, the pinion teeth are formed, finished and polished.

3. In a gear generating machine, the combination with a rotating disk of relatively large diameter, of a gear tooth generating worm on the periphery thereof, means including a pair of coaxial spindles adjacent the periphery of the disk providing spaced rotatable centers for receiving the ends of a gear blank, said means being rotatable about an axis in tangent relation to the periphery of the disk and being adjustably movable toward and away from the latter in substantially a radial direction with respect thereto, and means forming a positive driving connection between the disk and the first-named means for rotating said spindles simultaneously.

4. In a gear generating machine, the combination with a rotating disk of relatively large diameter, of a gear tooth generating worm on the periphery thereof, a pair of spaced coaxial spindles adjacent the periphery of the disk providing a centering and gripping means for a pinion blank, said spindles being rotatable about their common axis in tangential relation to the periphery of said disk, a movable carrying means in which said spindles are journaled, means for moving said carrying means to move the spindles toward and away from the disk in substantially a radial direction with respect to said disk, and means forming a driving connection between the disk and the spindles for rotating the latter at a certain rate with respect to the rate of rotation of the disk.

5. In a gear tooth forming machine, the combination with a disk of relatively large diameter, of a rigid supporting bearing means for the disk providing a fixed axis about which the disk revolves, a gear tooth generating means on the periphery of the disk, means adjacent the periphery of the disk for releasably gripping and holding a pinion blank and rotating the same in tangential relation with the periphery of the disk, said means being movable toward and away from the disk, and means forming a driving connection between the disk and the last-named means which provides a speed reduction from the disk to said means.

6. In a gear generating machine, the combination of a gear tooth generating worm having a thread of form and pitch corresponding to the desired form and circular pitch of a gear to be generated, a disk of relatively large diameter on the periphery of which said worm is carried, a shaft on which the disk is mounted and with which it rotates, a rigid supporting bearing for the shaft, means adjacent the periphery of the disk for releasably gripping and holding a gear blank, said means being rotatable about an axis substantially tangent to the periphery of the disk and being movable toward and away from said disk, and a gearing forming a positive driving connection between said last-named means and the shaft whereby they rotate together.

In witness whereof, I have hereunto set my hand this 17th day of April, 1925.

HENRY E. WARREN.